United States Patent [19]

Wu et al.

[11] Patent Number: 5,451,474

[45] Date of Patent: Sep. 19, 1995

[54] METAL HYDRIDE HYDROGEN STORAGE ELECTRODES

[75] Inventors: Han Wu, Barrington, Ill.; Anaba A. Anani, Lauderhill, Fla.

[73] Assignee: Motorola, Inc., Schaumburg, Ill.

[21] Appl. No.: 223,403

[22] Filed: Apr. 4, 1994

[51] Int. Cl.⁶ .......................................... H01M 10/34
[52] U.S. Cl. ........................................ 429/59; 420/900; 429/101; 429/218; 429/223
[58] Field of Search ............... 429/59, 101, 218, 223, 429/220, 219; 420/900

[56] References Cited

U.S. PATENT DOCUMENTS

| | | |
|---|---|---|
| 4,487,817 | 12/1984 | Willems et al. . |
| 4,551,400 | 11/1985 | Sapru et al. . |
| 4,623,597 | 11/1986 | Sapru et al. . |
| 4,728,586 | 3/1988 | Venkatesan et al. . |
| 4,902,579 | 2/1990 | Grosselli et al. .................. 428/610 |
| 5,096,667 | 3/1992 | Fetcenko . |
| 5,185,221 | 2/1993 | Rampel ............................ 429/59 |
| 5,277,999 | 1/1994 | Ovshinsky et al. . |

FOREIGN PATENT DOCUMENTS 1163569  7/1986  Japan .

*Primary Examiner*—Stephen Kalafut
*Assistant Examiner*—M. Nuzzolillo
*Attorney, Agent, or Firm*—Kenneth M. Massaroni

[57] ABSTRACT

An improved metal hydride hydrogen storage alloy electrode (20) for use in an electrochemical cell (10). The improved electrode (20) includes a hydrogen storage alloy material (22) having a layer of a passivation material (25) disposed thereon.

14 Claims, 4 Drawing Sheets

METAL HYDRIDE HYDROGEN STORAGE ELECTRODES

TECHNICAL FIELD

This present invention relates to electrochemical hydrogen storage alloys and rechargeable electrochemical cells using these alloys.

BACKGROUND OF THE INVENTION

Rechargeable electrochemical cells that use a nickel-hydroxide positive electrode and a metal hydride forming hydrogen storage negative electrode are well known in the art. In fact over the past several years, metal hydride cells have gained widespread market acceptance due to the fact that they incorporate highly desirable performance characteristics. Examples of these desirable characteristics include high charge acceptance, relatively long-cycle life and operation over a wide range of temperatures. Each of these performance characteristics represent improvements over the nickel cadmium and other battery systems known in the prior art.

Typically, the metal hydride hydrogen storage electrode is the negative electrode in a hydrogen storage system. The negative electrode material (M) is charged by the electrochemical absorption of hydrogen, and the electrochemical evolution of a hydroxyl ion. The reaction which takes place at the metal hydride electrode may be described according to the following formula:

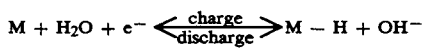

The reaction that takes place at the positive electrode of a nickel metal hydride cell is also a reversible reaction. In the case of a nickel hydroxide electrode, the positive electrode reaction is as follows:

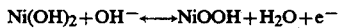

The negative electrode of most metal hydride electrochemical cells can be characterized by one of two chemical formulas: The first is $AB_2$, which describes TiNi type battery systems such as described in, for example, U.S. Pat. No. 5,277,999. The second formula is $AB_5$ which describes $LaNi_5$ type systems as described in, for example, U.S. Pat. No. 4,487,817.

Substantially all metal hydride electrochemical cells fall into one of these two categories. However, with respect to both of these types of materials, it has been found that the failure mode is usually the result of degradation of the metal hydride electrode. This degradation has been ascribed to the growth of a surface oxide film on the surface of the metal hydride electrode. The oxide film reduces the active area of the electrode, thus reducing the available area for the hydrogen reduction/oxidation reaction to occur. Since the total current has to be distributed over a smaller total area, the current density on the active surface increases. As a consequence, the rate of formation of the irreversible oxide layer increases. The internal resistance of the electrode also increases, further hastening failure of the electrode.

Moreover, the power density of metal hydride cells is not as great as in some other types of cells, notably nickel cadmium. Accordingly, metal hydride cells have not been appropriate for several applications, such as power tools.

Prior attempts to address these problems have focused mainly on the addition of more and more modifier elements to the hydrogen storage alloy material which makes up the metal hydride electrode. For example, many current examples of metal hydride materials include ten or more components mixed in varying ratios. As with any alloy, adding new elements to the hydrogen storage material increases complexity of the formation process, and adds to the cost of the overall material.

Accordingly, there exists a need to provide a means by which to reduce the formation of surface oxides on the surface of the metal hydride electrode and in the metal hydride electrochemical cells. The means for reducing oxide formation should be relatively simple, and not necessitate the use of additional elements added to the hydrogen storage alloy. Further, a need exists for metal hydride cells having relatively high power densities and capacities.

SUMMARY OF THE INVENTION

Briefly, according to the invention, there is provided an electrode for an electrochemical hydrogen storage cell. The hydrogen storage electrode comprises a hydrogen storage alloy capable of reversibly electrochemically storing and discharging hydrogen, and a layer of a passivation material disposed atop said hydrogen storage alloy material. In one preferred embodiment, the layer of passivation material may be hydrogen permeable, and may further prevent or reduce the formation of oxides on the surface of the hydrogen storage alloy material.

Further according to the invention, there is provided a method of passivating a electrochemical hydrogen storage alloy material so as to prevent the formation of oxides on the surface thereof. This method includes the steps of providing a hydrogen storage alloy material capable of electrochemically storing and discharging hydrogen, and disposing a layer of a hydrogen permeable passivation material atop said hydrogen storage alloy material.

Further according to the invention, there is provided electrochemical hydrogen storage cells including a negative electrode, a positive electrode, and an electrolyte. The negative electrode comprises a hydrogen storage alloy capable of reversibly electrochemically storing and discharging hydrogen and having a layer of hydrogen permeable passivation material disposed there atop.

DETAILED DESCRIPTION OF THE PREFERRED EMBODIMENT

Figure 1:
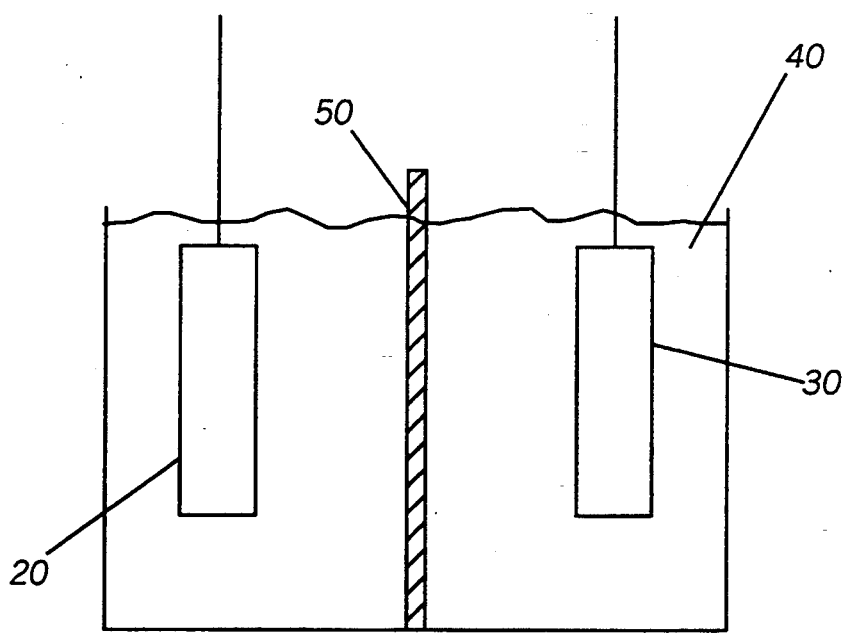
FIG. 1 is a schematic representation of an electrochemical cell including an improved metal hydride hydrogen storage alloy electrode in accordance with the instant invention.

While the specification concludes with claims defining the features of the invention that are regarded as novel, it is believed that the invention will be better understood from a consideration of the following description in conjunction with the drawing figures, in which like reference numerals are carried forward.

Referring now to FIG. 1, there is illustrated therein a schematic representation of an electrochemical cell including a metal hydride hydrogen storage alloy electrode coated with a layer of a passivation material in accordance with the instant invention. The electrochemical cell 10 includes a negative electrode 20 and a positive electrode 30. Both electrodes are immersed in an electrolyte 40 and separated from one another by an appropriate separator 50.

The negative electrode 20 of the electrochemical cell 10 is a metal hydride hydrogen storage alloy electrode. Accordingly, the material may be either the $AB_2$ or $AB_5$ type metal hydride hydrogen storage alloy material. The metal hydride hydrogen storage alloy materials may be characterized by the following formula: $(Ti_{2-x}Zr_xV_{4-y}Ni_y)_{1-z}M_z$ wherein M is a modifier element selected from the groups of materials, including chromium, cobalt, manganese, aluminum, iron, iridium, molybdenum and combinations thereof and where x, y, and z indicate the relative proportion of each of the materials in the alloy. Disposed atop the metal hydride hydrogen storage alloy material is a layer of hydrogen permeable passivation material (as illustrated in more detail in FIG. 2 hereof).

The positive electrode 30 may be fabricated of any of the number of known materials in the electrochemical arts. In one preferred embodiment, a positive electrode may be a nickel hydroxide positive electrode.

The negative and positive electrodes 20 and 30 respectively, are immersed in electrolyte 40. The electrolyte may be an electrolyte known in the art, such as, for example, 31% KOH. Disposed between the negative and positive electrodes is a separator 50 fabricated of, for example, a polymeric material, such as one or more layers of, or a combination of non-woven or microporous polypropylene (Celgard)

Figure 2:
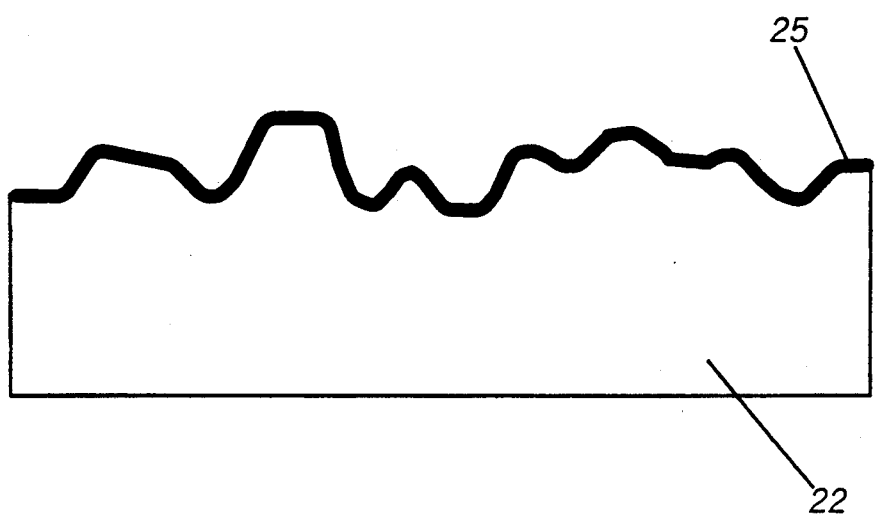
FIG. 2. is a schematic side view of a metal hydride hydrogen storage alloy electrode coated with a layer of passivation material.

Referring now to FIG. 2, there is illustrated therein a cross-sectional side view of the negative electrode 20 of FIG. 1. The negative electrode 20 includes a body of a metal hydride hydrogen storage alloy 22, and a layer of a hydrogen permeable passivation material 25 disposed atop the metal hydride hydrogen storage alloy material 22. As used herein, a passivation material refers to a material which is a relatively hydrogen-permeable material, and which discourages, reduces, or prevents the formation of oxides, such as oxides of lanthanum and/or nickel, on the surface of the metal hydride hydrogen storage alloy material. The layer of passivation material serves several beneficial purposes. For example, by preventing or reducing the formation of oxides on the surface of the hydrogen storage alloy material, there is no decrease in the active area of the electrode. In other words, the available area for the hydrogen oxidation/reduction reaction remains unreduced. Further, since there is no decrease in the total area of the electrode (since no oxides are formed) over which current is distributed, the current density at the surface is not increased. As a result, cycle life of the metal hydride hydrogen storage alloy material may be considerably lengthened.

It has also been found that the layer of passivation material contributes to increased power density for the hydrogen storage alloy material. This is due to the fact that hydrogen will react with, for example, a palladium passivation material much more quickly than the metal hydride material.

The electrochemical hydrogen storage alloy material may be passivated so as to prevent the formation of oxides on the surface thereof by providing a hydrogen storage alloy material capable of reversibly electrochemically storing and discharging hydrogen, and disposing a layer of hydrogen permeable passivation material atop the hydrogen storage alloy material. Preferred materials for use as the passivation material include palladium, cobalt, nickel, copper, gold, silver, platinum, iridium, vanadium, niobium, titanium, palladium alloys, cobalt alloys, nickel alloys, copper alloys, gold alloys, silver alloys, platinum alloys, iridium alloys, vanadium alloys, niobium alloys, titanium alloys, and combinations thereof. Further, the passivation material may be selected so that the reversible potential of the material is not within the potential range of the positive and negative electrodes. This will reduce the possibility of oxidation of the passivation material. Accordingly, the passivation material may, in a preferred embodiment, be palladium.

The passivation material may be disposed atop the layer of metal hydride hydrogen storage alloy material in any one of the number of known techniques. For example, the passivation material may be deposited atop the hydrogen storage alloy by a vacuum deposition method. Alternatively, the hydrogen storage alloy may be coated by the passivation material in an electrodeposition process. In yet another embodiment, the passivation material is mechanically sheared/mixed, i.e., mechanically alloyed with said hydrogen storage alloy material so as to coat it. An example of this process may be, for example, ball milling. The passivation material is typically deposited atop the hydrogen storage alloy material to a thickness of between 0.01 $\mu$ and 5.0 $\mu$, and preferably approximately 0.5 $\mu$.

By providing a layer of passivation material on the surface of the hydrogen storage alloy material, several improvements in the performance of the alloy are observed. First, the passivation material reduces the rate of growth of the irreversible oxide layers on the surface of the metal hydride electrodes. This occurs since the passivation layer acts essentially as a barrier between the metal hydride electrode and the electrolyte. Thus, the majority of the hydrogen oxidation/reduction occurs on the surface of the passivation material, rather than on the surface of the metal hydride electrode. Thus, the cycle life of the electrode is extended. Further, the passivation material, such as palladium, is typically a good catalyst for the hydrogen oxidation/reduction reaction. Thus, the passivation layer provides reaction sites with less kinetic overpotential for hydrogen reactions. Accordingly, the electrode has less voltage loss, producing higher working voltages and requiring lower charging voltage during recharging cycles.

Finally, a passivation material such as palladium is hydrogen permeable. The hydrogen storing characteristics of the metal hydride electrode is therefor not hindered in any way. During the charging of the cell, hydrogen atoms diffuse through the palladium layer, entering the body of metal hydride alloy and are stored therein. Thus, the capacity of the cell will not be reduced.

EXAMPLES

An improved metal hydride hydrogen storage alloy material including a layer of passivation material thereon was fabricated in accordance with the instant invention. More particularly, metal hydride hydrogen storage alloy material having the composition: $La_{0.52}Nd_{0.44}Ce_{0.04}Ni_{5.1}Mn_{0.33}Al_{0.14}Co_{0.1}Fe_{0.01}$ and known as International Battery Association Common Sample No. 3 was mixed with a palladium powder. Combination of the materials was via mechanical shearing/mixing. The mixing not only produced a homogenous mixture of the two powders but by the shear force of the two phases, the sorer palladium was pressed against the harder, more brittle metal hydride hydrogen storage alloy particles. As a result, the palladium powder deformed and coated the metal hydride hydrogen storage alloy particles. An example of mechanical shear/mixing is ball milling. Experiments were carried out by grinding a 10% palladium powder with the metal hydride hydrogen storage alloy powder in an agate mortar prior to being fabricated onto teflon-bonded electrodes. The thickness of the palladium layer was about 0.5 $\mu$. The bonded, fixed electrodes were then tested against the conventional metal hydride hydrogen storage alloy electrodes described above, lacking the palladium passivating layer. The results are illustrated in FIGS. 3-5.

Figure 3:
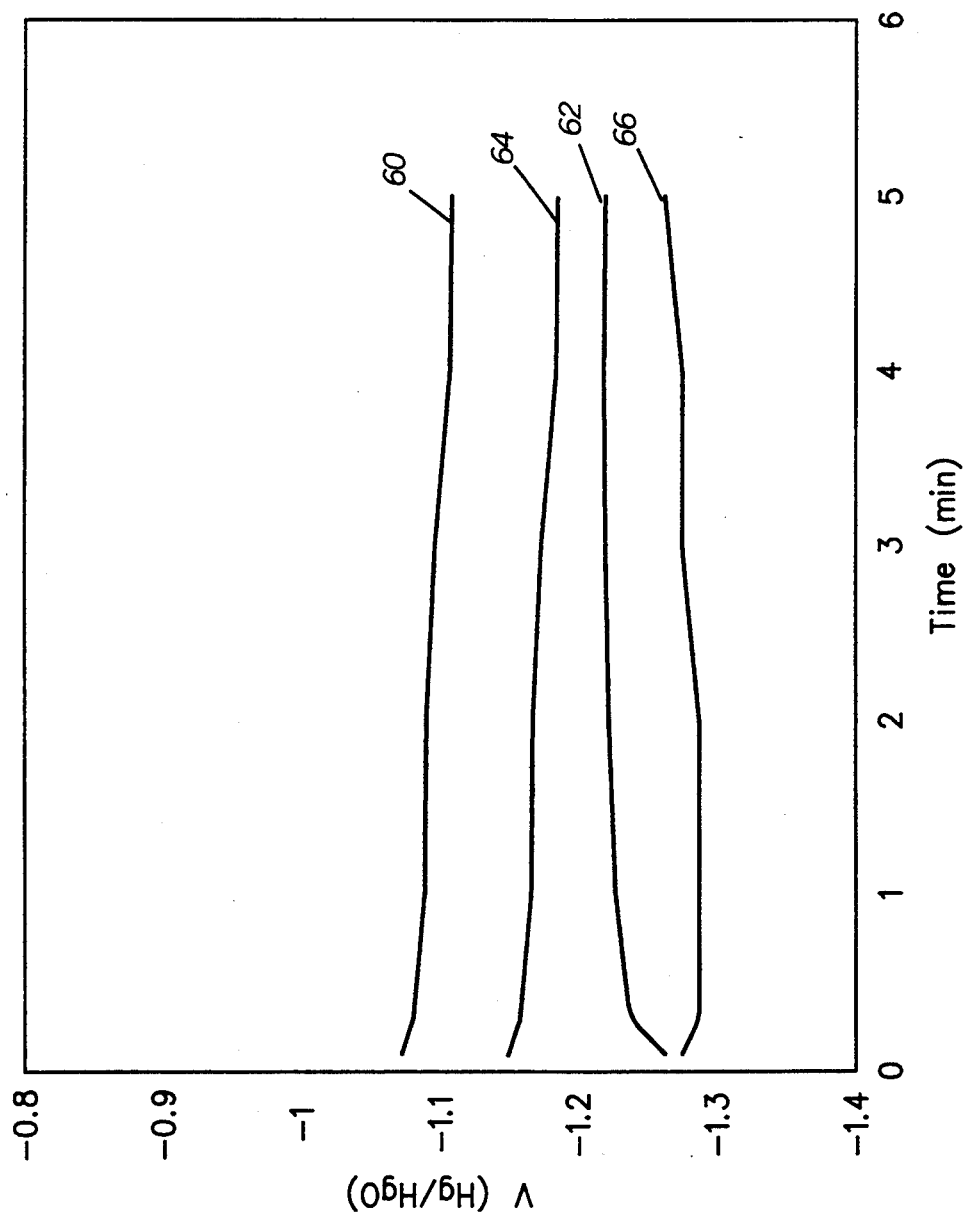
FIG. 3. is a chart illustrating voltage versus time for metal hydride hydrogen storage electrodes including a layer of passivation material versus unpassivated metal hydride electrodes and illustrating electrode potential during charge.

Referring now to FIG. 3, there is illustrated therein the potential of a palladium coated metal hydride electrode versus the potential of a conventional nickel metal hydride electrode during constant current charging at two different current levels. Specifically, lines 60 and 62 illustrate results for an electrode with and without a passivation material, respectively. Testing for both electrodes was conducted at 50 mA. Similarly, lines 64 and 66 illustrate results for passivated and unpassivated electrodes respectively, at 115 mA. From the curves illustrated on FIG. 3, it is apparent that the electrode including the palladium coating not only exhibited less overpotential, (at least 100 m/V improvement over conventional metal hydride electrodes) but also required less voltage at the initial moment of the charging process.

Figure 4:
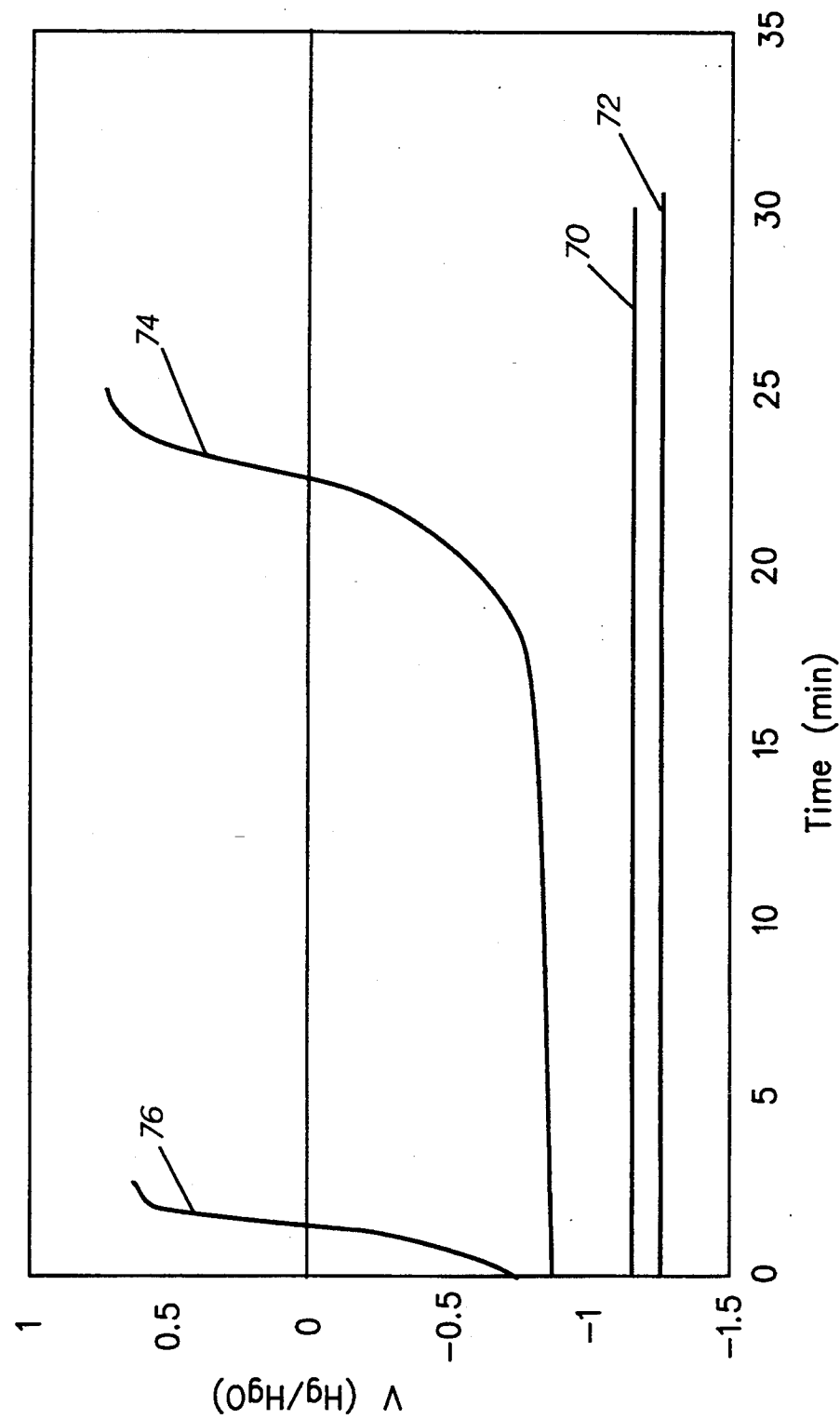
FIG. 4. is a chart illustrating voltage versus time for passivated and unpassivated metal hydride hydrogen storage electrodes showing electrode potential during charge/discharge.

Referring now to FIG. 4, there is illustrated therein a comparison of the charge acceptance of a conventional nickel metal hydride electrode versus that of a palladium coated metal hydride electrode. Both electrodes were charged at C rate for 30 minutes and then discharged at C/2 to measure the discharge capacity. Lines 70 and 72 illustrate results, respectively, for electrodes with and without a layer of passivation material, for tests conducted at 115 mA. Similarly, lines 74 and 76 illustrate results, respectively, for passivated and unpassivated electrodes for tests run at a C/2 rate of 58 mA. The palladium coated electrode demonstrated approximately 35% coulombic efficiency whereas the conventional electrode demonstrated that only approximately 3% of the charge was accepted. Accordingly, it may be appreciated that the palladium coated electrode is considerably more efficient than conventional metal hydride electrodes.

Figure 5:
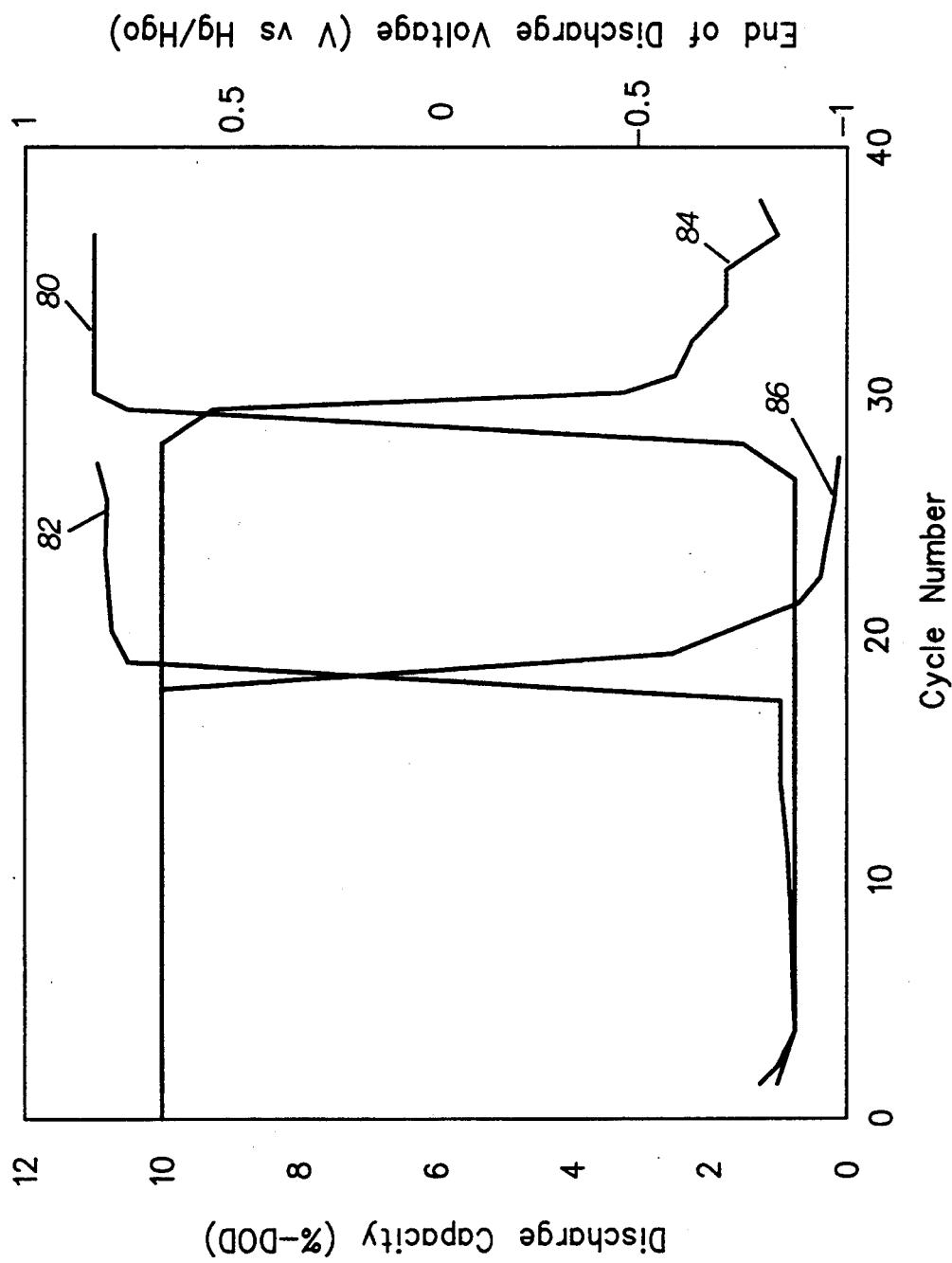
FIG. 5 is a chart illustrating capacity versus cycle life with of electrodes in accordance with the instant invention versus unpassivated electrodes.

FIG. 5 illustrates life cycle testing for both passivated and unpassivated metal hydride hydrogen storage electrodes. Specifically, lines 80 and 82 illustrate voltage at end of discharge for passivated and unpassivated electrodes respectively. Similarly, lines 84 and 86 illustrate, respectively, capacity for passivated and unpassivated electrodes. As may be appreciated from FIG. 5, the voltage and capacity performance characteristics of both electrodes was substantially the same, except for cycle life, which was considerably longer for the passivated electrode.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. An electrode for an electrochemical hydrogen storage cell, said electrode comprising a plurality of hydrogen storage alloy material powder particles capable of electromically storing and discharging hydrogen, each said powder particle being coated with a layer of palladium or a palladium alloy.

2. An electrode as in claim 1, wherein said layer of passivation material prevents the formation of oxides on the surface of said hydrogen storage alloy material.

3. An electrode as in claim 1, wherein said passivation material is hydrogen permeable.

4. An electrode as in claim 1, wherein said hydrogen storage alloy material is an $AB_5$-type hydrogen storage alloy material.

5. An electrode as in Claim 1, wherein said hydrogen storage alloy material is an $AB_2$-type hydrogen storage alloy material.

6. A method of fabricating an electrochemical hydroge storage alloy electrode, said method comprising the steps of:
   providing hydrogen storage alloy powder particles capable of reversibly, electrochemically storing and discharging hydrogen;
   coating said hydrogen storage alloy powder particles with palladium or a palladium alloy, passivation material; and
   bonding said passivation material coated hydrogen storage alloy into an electrode.

7. A method as in claim 6, including the further step of vacuum depositing said layer of passivation material atop said hydrogen storage alloy.

8. A method as in claim 6, including the further step of disposing said layer of passivation material by mechanically shearing/mixing said passivation material and said hydrogen storage alloy material.

9. A method as in claim 6, including the further step of electrodepositing said layer of passivation material atop said hydrogen storage alloy.

10. A method as in claim 6, including the further step of disposing said passivation material to a thickness of between 0.1 $\mu$ and 2.0 $\mu$.

11. An electrochemical hydrogen storage cell, comprising:
   a negative electrode including a plurality of hydrogen storage alloy particles powder capable of reversibly electrochemically storing and discharging hydrogen, each said particle being coated with palladium or a palladium alloy, passivation material;
   a positive electrode; and
   an electrolyte.

12. A cell as in claim 11, wherein said passivation material prevents the formation of oxides on the surface of said hydrogen storage alloy material.

13. A cell as in claim 11, wherein said hydrogen storage alloy material is an $AB_5$-type hydrogen storage alloy material.

14. An electrode as in claim 11, wherein said hydrogen storage alloy material is an $AB_2$-type hydrogen storage alloy material.

* * * * *